US012333925B2

(12) United States Patent
Carey

(10) Patent No.: US 12,333,925 B2
(45) Date of Patent: Jun. 17, 2025

(54) THEFT PREDICTION AND TRACKING SYSTEM

(71) Applicant: James Carey, Commack, NY (US)

(72) Inventor: James Carey, Commack, NY (US)

( * ) Notice: Subject to any disclaimer, the term of this patent is extended or adjusted under 35 U.S.C. 154(b) by 0 days.

(21) Appl. No.: 18/358,354

(22) Filed: Jul. 25, 2023

(65) Prior Publication Data

US 2023/0386319 A1 Nov. 30, 2023

Related U.S. Application Data

(63) Continuation of application No. 17/887,786, filed on Aug. 15, 2022, now Pat. No. 11,710,397, which is a (Continued)

(51) Int. Cl.
*G08B 13/00* (2006.01)
*G08B 13/196* (2006.01)
(Continued)

(52) U.S. Cl.
CPC ....... *G08B 31/00* (2013.01); *G08B 13/19608* (2013.01); *G08B 13/2454* (2013.01); *G08B 13/246* (2013.01); *G08G 5/723* (2025.01)

(58) Field of Classification Search
CPC ................ G08B 31/00; G08B 13/2402; G08B 13/19673; G08B 13/19608;
(Continued)

(56) References Cited

U.S. PATENT DOCUMENTS 6,975,346 B2 12/2005 Kumhyr
7,308,487 B1 12/2007 Dansie et al.
(Continued)

FOREIGN PATENT DOCUMENTS

KR 20090038569 A 4/2009
RU 2459267 C2 8/2012
(Continued)

OTHER PUBLICATIONS

Russian Office Action dated Jul. 21, 2020 issued in corresponding RU Appln. No. 2018133609.
(Continued)

*Primary Examiner* — Zhihan Zhou
(74) *Attorney, Agent, or Firm* — Carter, DeLuca & Farrell LLP

(57) ABSTRACT

Systems and methods for detecting potential theft and identifying individuals having a history of committing theft use an electromagnetic emission associated with a personal electronic device associated with an individual is received from at least one of a sensor that is coupled to at least one of a traffic camera or an aerial drone camera. One or more signal properties of the electromagnetic emission are analyzed to determine an emission signature. Video data and video analytics are correlated with the emission signature to identify the individual having possession of the item. The emission signature and video data are stored for later use during a checkout procedure. If an emission signature detected at a checkout station matches that of the individual having possession of the item, and the item is not processed through the checkout station, an alert is issued and the individual is flagged as a potential shoplifter.

17 Claims, 7 Drawing Sheets

Related U.S. Application Data continuation of application No. 16/599,691, filed on Oct. 11, 2019, now Pat. No. 11,417,202, which is a continuation-in-part of application No. 15/445,355, filed on Feb. 28, 2017, now Pat. No. 11,113,937.

(60) Provisional application No. 62/301,904, filed on Mar. 1, 2016.

(51) Int. Cl.
*G08B 13/24* (2006.01)
*G08B 31/00* (2006.01)
*G08G 5/72* (2025.01)

(58) Field of Classification Search
CPC .............. G08B 13/2454; G08B 13/246; G08B 13/248; G08G 5/0078; G08G 5/723; B65D 2211/00; G01R 21/00; G01S 3/04; G06K 7/00; G06K 9/00771; G06K 9/00228; G06K 7/10009; G07C 9/00111; G07C 9/00079; H04B 5/0062; H04B 5/0025
USPC .......................................................... 348/143
See application file for complete search history.

(56) References Cited

U.S. PATENT DOCUMENTS

| | | | | |
|---|---|---|---|---|
| 9,098,954 | B1 | 8/2015 | Byrd | |
| 11,113,937 | B2 | 9/2021 | Carey | |
| 11,417,202 | B2 | 8/2022 | Carey | |
| 11,710,397 | B2 | 7/2023 | Carey | |
| 2004/0161133 | A1 | 8/2004 | Elazar et al. | |
| 2005/0102183 | A1 | 5/2005 | Kelliher et al. | |
| 2005/0146605 | A1 | 7/2005 | Lipton et al. | |
| 2007/0003141 | A1 | 1/2007 | Rittscher et al. | |
| 2007/0057049 | A9 | 3/2007 | Kundu et al. | |
| 2007/0127774 | A1 | 6/2007 | Zhang et al. | |
| 2007/0182818 | A1 | 8/2007 | Buehler | |
| 2007/0254634 | A1 | 11/2007 | Costa-Requena et al. | |
| 2007/0297607 | A1 | 12/2007 | Ogura et al. | |
| 2008/0018738 | A1 | 1/2008 | Lipton et al. | |
| 2008/0106599 | A1 | 5/2008 | Liu et al. | |
| 2008/0198231 | A1 | 8/2008 | Ozdemir et al. | |
| 2008/0246613 | A1* | 10/2008 | Linstrom | G08B 13/19695 340/572.4 |
| 2008/0263610 | A1 | 10/2008 | Murray et al. | |
| 2009/0033745 | A1 | 2/2009 | Yeredor et al. | |
| 2009/0222388 | A1 | 9/2009 | Hua et al. | |
| 2009/0222466 | A1 | 9/2009 | Allison et al. | |
| 2010/0026802 | A1 | 2/2010 | Titus et al. | |
| 2010/0079594 | A1 | 4/2010 | Voglewede et al. | |
| 2010/0097473 | A1 | 4/2010 | Park et al. | |
| 2010/0135643 | A1 | 6/2010 | Fleming | |
| 2010/0182428 | A1 | 7/2010 | Lu et al. | |
| 2010/0321183 | A1 | 12/2010 | Donovan et al. | |
| 2011/0211070 | A1 | 9/2011 | Shu et al. | |
| 2011/0219385 | A1 | 9/2011 | Jacobson et al. | |
| 2012/0008836 | A1 | 1/2012 | Bobbitt et al. | |
| 2012/0127314 | A1 | 5/2012 | Clements | |
| 2012/0147169 | A1 | 6/2012 | Harper et al. | |
| 2012/0194676 | A1 | 8/2012 | Laganiere et al. | |
| 2012/0198221 | A1 | 8/2012 | Tukol et al. | |
| 2012/0208592 | A1 | 8/2012 | Davis et al. | |
| 2012/0229647 | A1 | 9/2012 | Calman et al. | |
| 2012/0233032 | A1 | 9/2012 | Calman et al. | |
| 2012/0233033 | A1 | 9/2012 | Calman et al. | |
| 2012/0262575 | A1 | 10/2012 | Champagne et al. | |
| 2012/0324061 | A1 | 12/2012 | Parsons et al. | |
| 2012/0327241 | A1 | 12/2012 | Howe | |
| 2013/0027561 | A1 | 1/2013 | Ee et al. | |
| 2013/0041961 | A1 | 2/2013 | Thrower, III et al. | |
| 2013/0278425 | A1 | 10/2013 | Cunningham et al. | |
| 2014/0254890 | A1 | 9/2014 | Bergman et al. | |
| 2015/0002269 | A1* | 1/2015 | Bajema | G08B 13/248 340/8.1 |
| 2015/0244992 | A1 | 8/2015 | Buehler | |
| 2015/0341599 | A1 | 11/2015 | Carey | |
| 2015/0348342 | A1 | 12/2015 | Baxley et al. | |
| 2017/0169681 | A1 | 6/2017 | Markaryan | |
| 2017/0187991 | A1 | 6/2017 | Toros | |
| 2017/0256149 | A1* | 9/2017 | Carey | G08B 13/246 |
| 2017/0308757 | A1* | 10/2017 | Nguyen | G06V 40/23 |
| 2018/0184244 | A1* | 6/2018 | Bestor | G06V 20/52 |
| 2019/0172293 | A1 | 6/2019 | Carey | |
| 2020/0178060 | A1 | 6/2020 | Gladish | |

FOREIGN PATENT DOCUMENTS

| | | | |
|---|---|---|---|
| RU | 124017 | U1 | 1/2013 |
| RU | 2565012 | C2 | 10/2015 |
| RU | 2572369 | C2 | 1/2016 |
| WO | 2004034347 | A1 | 4/2004 |
| WO | 2007139994 | A2 | 12/2007 |
| WO | 2012102909 | A1 | 8/2012 |
| WO | 2012166211 | | 12/2012 |
| WO | 2012170551 | A2 | 12/2012 |
| WO | 2013030296 | A1 | 3/2013 |
| WO | 2014155958 | A1 | 10/2014 |

OTHER PUBLICATIONS

Daniel A. Vaquera et al., "Attribute-Based People Search," Chapter 14, Intellegent Video Surveillance: Systems and Technology, published Dec. 16, 2009, pp. 387-405.
Anonymous: "Configuration Backup Restore", Jun. 30, 2010 (Jun. 30, 2010), XP055127450, retrived from the Internet: URL: https://downloads.avaya.com/css/P8/documents/1 00088380 [retrieved on Jul. 8, 2014].
Song et al., "Real-Time Monitoring for Crowd Counting Using Video Surveillance and GIS," IEEE, 2nd International Conference on Remote Sensing, Environment and Transportation Engineering (RSETE), Jun. 1, 2012, 4 pages.
Smith, K., et al. "Detecting Abandoned Luggage Items in a Public Space," IEEE Performance Evaluation of Tracking and Surveillance Workshop (PETS), IDIAP Research Report, Jun. 2006, pp. 1-14.
International Search Report and Written Opinion dated Jul. 17, 2017 in corresponding International Application No. PCT/US17/19971, 27 pages.
Partial Supplementary European Search Report dated Oct. 11, 2019 issued in corresponding counterpart EP Appln. No. 17760620.9.
Extended European Search Report dated Feb. 18, 2021 issued in corresponding EP Appln. No. 20201201.9.
European Examination Report dated Mar. 31, 2022 issued in corresponding EP Appln. No. 20 201 201.9.
Vaquero et al., "Attribute-Based People Search," Chapter 14, Intellegent Video Surveillance: Systems and Technology, published Dec. 16, 2009, pp. 387-405.
Partial European Search Report dated Oct. 11, 2019 issued in corresponding EP Appln. No. 17760620.9.
European Examination Report issued in corresponding application EP 20201201.9 dated Dec. 8, 2022 ( 5 pages).
Daniel A. Vaquero et al., "Attribute-Based People Search," Chapter 14, Intellegent Video Surveillance: Systems and Technology, published Dec. 16, 2009, pp. 387-405.
International Search Report and Written Opinion issued on Jul. 17, 2017 in corresponding International Application No. PCT/US17/19971, 27 pages.
European Examination Report dated Oct. 8, 2021 issued in corresponding EP Appln. No. 17760620.9.
Office Action issued in corresponding Canadian Application No. 3,095,813 dated Jun. 20, 2023 (4 pages).
Canadian Office Action issued in corresponding application 3,016,434 dated Aug. 3, 2023 (6 pages).

(56) References Cited

OTHER PUBLICATIONS

Office Action issued in corresponding Canadian Patent Application No. 3,095,813 dated Mar. 20, 2024 (4 pages).

* cited by examiner

THEFT PREDICTION AND TRACKING SYSTEM

CROSS-REFERENCE TO RELATED APPLICATIONS

The present application is a continuation of U.S. patent application Ser. No. 17/887,786, filed on Aug. 15, 2022, now U.S. Pat. No. 11,710,397, which is a continuation of U.S. patent application Ser. No. 16/599,691, filed on Oct. 11, 2019, now U.S. Pat. No. 11,417,202, which is a continuation-in-part of U.S. patent application Ser. No. 15/445,355, filed on Feb. 28, 2017, now U.S. Pat. No. 11,113,937, which claims the benefit of U.S. Provisional Patent Application No. 62/301,904, filed on Mar. 1, 2016. The disclosures of each of the foregoing applications are hereby incorporated by reference herein in their entireties for all purposes.

BACKGROUND

1. Technical Field

The present disclosure is directed to systems and methods for loss prevention, and in particular, to systems and related methods of utilizing radiofrequency emissions from personal electronic devices for detecting theft, identifying individuals associated with such theft, and predicting the likelihood that an individual will commit theft.

2. Background of Related Art

Many modern enterprises depend upon information technology systems which track inventory and sales in an effort to reduce shrinkage resulting from theft by customers and employees, breakage, and handling errors.

Companies are continually trying to identify specific user behavior in order to improve the throughput and efficiency of the company. For example, by understanding user behavior in the context of the retail industry, companies can both improve product sales and reduce product shrinkage. Therefore, companies seek to improve their understanding of user behavior in order to reduce, and ultimately, eliminate, inventory shrinkage.

Companies have utilized various means to prevent shrinkage. Passive electronic devices attached to theft-prone items in retail stores are used to trigger alarms, although customers and/or employees may deactivate these devices before an item leaves the store. Some retailers conduct bag and/or cart inspections for both customers and employees while other retailers have implemented loss prevention systems that incorporate video monitoring of POS transactions to identify transactions that may have been conducted in violation of implemented procedures. Such procedures and technologies tend to focus on identifying individual occurrences rather than understanding the underlying user behaviors that occur during these events. As such, companies are unable to address the underlying conditions which enable individuals to commit theft.

Video surveillance systems and the like are widely used. In certain instances, camera video is continually being captured and recorded into a circular buffer having a period of, for example, 8, 12, 24, or 48 hours. As the circular buffer reaches its capacity, and in the event the recorded video data is not required for some purpose, the oldest data is overwritten. In some cases, a longer period of time may be utilized and/or the recorded data is stored indefinitely. If an event of interest occurs, the video is available for review and analysis of the video data. However, known video surveillance systems may have drawbacks, because they are unable to recognize and identify individuals who may be potential or repeat offenders.

SUMMARY

According to an aspect of the present disclosure, a method of theft prediction and tracking is provided. The method includes collecting, from at least one of a sensor that is coupled to, or included as part of, at least one of a traffic camera or an aerial drone camera, an electromagnetic signal associated with an individual, and issuing an alert in response to a determination that at least one of the electromagnetic signal or the individual is associated with undesirable activity.

In another aspect of the present disclosure, the method further includes identifying a signal property of the electromagnetic signal.

In still another aspect of the present disclosure, an individual identifier is associated with the individual, and the method further includes determining whether the individual has taken possession of an item having an item identifier, and storing the item identifier in association with the individual identifier in response to a determination that the individual has taken possession of the item. In a case where the individual is present in a retail establishment, takes possession of the item, and then proceeds to move rapidly toward the exit of the retail establishment, depending on the circumstances (e.g., the individual's location and path of travel throughout the retail establishment and/or the spatial arrangement of video cameras and/or RF emission detectors throughout the establishment) the individual may or may not be recognized as having taken possession of the item, for example, by a tripwire detection feature of a theft prediction and tracking system. However, in addition or as an alternative, the method may further include detecting (e.g., by way of one or more video cameras and/or RF emission detectors of the theft prediction and tracking system) the rapid movement of the individual towards the exit. Further, the individual's movement toward the exit may trigger one or more RF devices, scanners, and/or sensors to trigger an alarm. In either case, the method may further include (1) capturing and/or identifying personal information associated with the individual (e.g., by way of one or more video cameras, RF emission detectors, and/or other sensors that can obtain information regarding the individual, such as a video of the individual, an RF signal from a mobile communication device (e.g., a smartphone) carried by the individual, and/or the like); (2) flagging the individual as a potential shoplifter; and/or (3) pushing a tag or flag onto a mobile communication device possessed by the individual that enables the individual to be tracked for future entrance into retail establishments, and/or uploading the tag or flag to a server enabling a community of retail establishments to track the individual. In some embodiments, the method can include tracking the individual by way of pushing one or more notifications and/or flags to the mobile communication device of the individual in combination with employing any of the other flagging procedures described herein. The RF emission detectors and/or beacons may be positioned inside and/or outside the retail establishment(s).

In yet another aspect of the present disclosure, the method further includes establishing a list of one or more entitled item identifiers corresponding to items to which the individual is entitled, and issuing an alert in response to a determination that the stored item identifier is not within the list of one or more entitled item identifiers.

In another aspect of the present disclosure, the method further includes associating the individual with undesirable activity in response to a determination that the stored item identifier is not within the list of one or more entitled item identifiers.

In another aspect of the present disclosure, the method further includes storing a timestamp indicative of the time of collection of the electromagnetic signal.

In another aspect of the present disclosure, the method further includes storing indicia of the undesirable activity on an electronic device associated with the individual.

In another aspect of the present disclosure, the method further includes recording an image of the individual.

In another aspect of the present disclosure, the issuing of the alert includes displaying the recorded image of the individual.

According to another aspect of the present disclosure, a theft prediction and tracking system is provided The system includes at least one RF emission detector, at least one video camera, a processor operatively coupled to the at least one RF emission detector and the at least one video camera, a database operatively coupled to the processor, and a computer-readable storage medium operatively coupled to the processor. In some embodiments, the at least one video camera is at least one of a traffic camera or an aerial drone camera. The computer-readable storage medium includes instructions, which, when executed by the processor, cause the processor to receive, from the at least one RF emission detector, at least one emissions signature from a personal electronic device associated with an individual; determine, from the at least one emissions signature, a physical location of the personal electronic device; receive video data from one of the at least one video camera having a physical location in proximity to the physical location of the personal electronic device; and identify the individual at least in part upon the at least one emissions signature or the video data.

In another aspect of the present disclosure, the video data includes metadata indicating that the individual has taken possession of an item having an item identifier.

In yet another aspect of the present disclosure, the theft prediction and tracking system further includes a checkout station operatively coupled to the processor.

In still another aspect of the present disclosure, the computer-readable storage medium further includes instructions, which, when executed by the processor, cause the processor to receive, from the checkout station, entitlement data including item identifiers relating to one or more items to which the individual is entitled; compare the entitlement data to the item identifier of the item in possession of the individual; and issue an alert if the item identifier of item in possession of the individual is not included in the entitlement data.

In another aspect of the present disclosure, the computer-readable storage medium further includes instructions, which, when executed by the processor, cause the processor to issue an alert if an emissions signature corresponding to the identified individual is received from an RF emission detector having a physical location in proximity to an exit.

In another aspect of the present disclosure, the computer-readable storage medium further includes instructions, which, when executed by the processor, cause the processor to store the identity of the individual in association with a potential shoplifter flag.

In another aspect of the present disclosure, the computer-readable storage medium further includes instructions, which, when executed by the processor, cause the processor to receive, from an RF emission detector having a physical location in proximity to an entrance, an emissions signature.

In another aspect of the present disclosure, the theft prediction and tracking system further includes a video recorder in operative communication with the processor, the video recorder configured to record video data received from the at least one video camera.

In another aspect of the present disclosure, the computer-readable storage medium further includes instructions, which, when executed by the processor, cause the processor to issue an alert comprising at least in part recorded video data received from the at least one video camera.

BRIEF DESCRIPTION OF THE DRAWINGS

Example embodiments in accordance with the present disclosure are described herein with reference to the drawings wherein.

DETAILED DESCRIPTION

Figure 1:
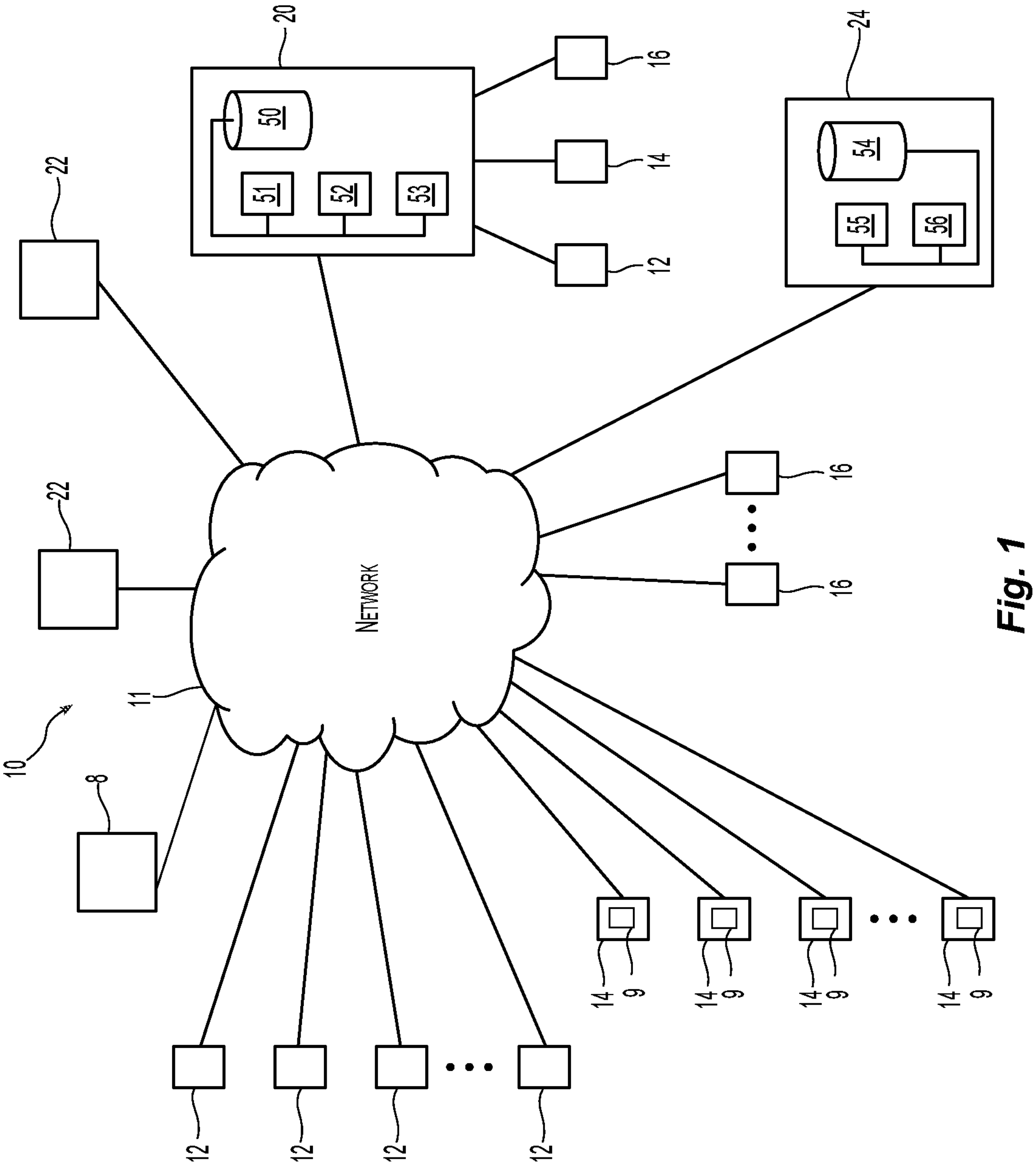
FIG. 1 is a block diagram of an embodiment of a theft prediction and tracking system in accordance with the present disclosure.

Particular embodiments of the present disclosure are described hereinbelow with reference to the accompanying drawings; however, it is to be understood that the disclosed embodiments are merely examples of the disclosure, which may be embodied in various forms. Well-known and/or repetitive functions and constructions are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

In this description, as well as in the drawings, like-referenced numbers represent elements which may perform the same, similar, or equivalent functions. Embodiments of the present disclosure are described in detail with reference to the drawings in which like reference numerals designate identical or corresponding elements in each of the several views. The word “exemplary” is used herein to mean “serving as an example, instance, or illustration.” Any embodiment described herein as “exemplary” is not necessarily to be construed as preferred or advantageous over other embodiments. The word "example" may be used interchangeably with the term "exemplary."

Additionally, embodiments of the present disclosure may be described herein in terms of functional block components, code listings, optional selections, page displays, and various processing steps. It should be appreciated that such functional blocks may be realized by any number of hardware and/or software components configured to perform the specified functions. For example, embodiments of the present disclosure may employ various integrated circuit components, e.g., memory elements, processing elements, logic elements, look-up tables, and the like, which may carry out a variety of functions under the control of one or more microprocessors or other control devices.

Similarly, the software elements of embodiments of the present disclosure may be implemented with any programming or scripting language such as C, C++, C#, Java, COBOL, assembler, PERL, Python, PHP, or the like, with the various algorithms being implemented with any combination of data structures, objects, processes, routines or other programming elements. The object code created may be executed on a variety of operating systems including, without limitation, Windows®, Macintosh OSX®, iOS®, Linux, and/or Android®.

Further, it should be noted that embodiments of the present disclosure may employ any number of conventional techniques for data transmission, signaling, data processing, network control, and the like. It should be appreciated that the particular implementations shown and described herein are illustrative of the disclosure and its best mode and are not intended to otherwise limit the scope of embodiments of the present disclosure in any way. Examples are presented herein which may include sample data items (e.g., names, dates, etc.) which are intended as examples and are not to be construed as limiting. Indeed, for the sake of brevity, conventional data networking, application development and other functional aspects of the systems (and components of the individual operating components of the systems) may not be described in detail herein. Furthermore, the connecting lines shown in the various figures contained herein are intended to represent example functional relationships and/or physical or virtual couplings between the various elements. It should be noted that many alternative or additional functional relationships or physical or virtual connections may be present in a practical electronic data communications system.

As will be appreciated by one of ordinary skill in the art, embodiments of the present disclosure may be embodied as a method, a data processing system, a device for data processing, and/or a computer program product. Accordingly, embodiments of the present disclosure may take the form of an entirely software embodiment, an entirely hardware embodiment, or an embodiment combining aspects of both software and hardware. Furthermore, embodiments of the present disclosure may take the form of a computer program product on a computer-readable storage medium having computer-readable program code means embodied in the storage medium. Any suitable computer-readable storage medium may be utilized, including hard disks, CD-ROM, DVD-ROM, optical storage devices, magnetic storage devices, semiconductor storage devices (e.g., USB thumb drives) and/or the like.

In the discussion contained herein, the terms "user interface element" and/or "button" are understood to be non-limiting, and include other user interface elements such as, without limitation, a hyperlink, clickable image, and the like.

Embodiments of the present disclosure are described below with reference to block diagrams and flowchart illustrations of methods, apparatus (e.g., systems), and computer program products according to various aspects of the disclosure. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, mobile device or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of ways of performing the specified functions, combinations of steps for performing the specified functions, and program instruction ways of performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of embodiments of the present disclosure may consist of any combination of databases or components at a single location or at multiple locations, wherein each database or system includes any of various suitable security features, such as firewalls, access codes, encryption, de-encryption, compression, decompression, and/or the like.

The scope of the disclosure should be determined by the appended claims and their legal equivalents, rather than by the examples given herein. For example, steps recited in any method claims may be executed in any order and are not limited to the order presented in the claims. Moreover, no element is essential to the practice of the disclosure unless specifically described herein as "critical" or "essential."

With respect to FIG. 1, an embodiment of a theft prediction and tracking system 10 in accordance with the present disclosure is presented. The system 10 includes one or more sensors, such as an RF emission detectors 12, one or more video cameras 14, and at least one checkout station 16. The one or more RF emission detectors 12, one or more video cameras 14, and the at least one checkout station 16 are in operative communication with server 20. In embodiments, the one or more RF emission detectors 12, one or more video cameras 14, or the at least one checkout station 16 are connected to server 20 via network 11, which may be a private network (e.g., a LAN), a public network (e.g., the Internet), and/or a combination of private and public networks. In some embodiments, the one or more RF emission detectors 12, one or more video cameras 14, and/or the at least one checkout station 16 may be connected to server 20 via a direct connection, such as a dedicated circuit, a hardwire cable, and the like, and/or may be connected to server 20 via a wireless connection, such as, without limitation, an 802.11 (WiFi) connection. Checkout station 16 includes at least one automatic identification device 17 (FIG. 2), which may include, without limitation a handheld and/or a stationary barcode scanner, an RFID interrogator, and the like. One or more monitoring devices 22 are in operable communication with server 20 to facilitate interaction between a user and theft prediction and tracking system 10, such as, without limitation, to facilitate the delivery of security alerts to security personnel, to enable viewing of images recorded by theft prediction and tracking system 10, to facilitate configuration, operation, and maintenance operations, and so forth.

Figure 2:
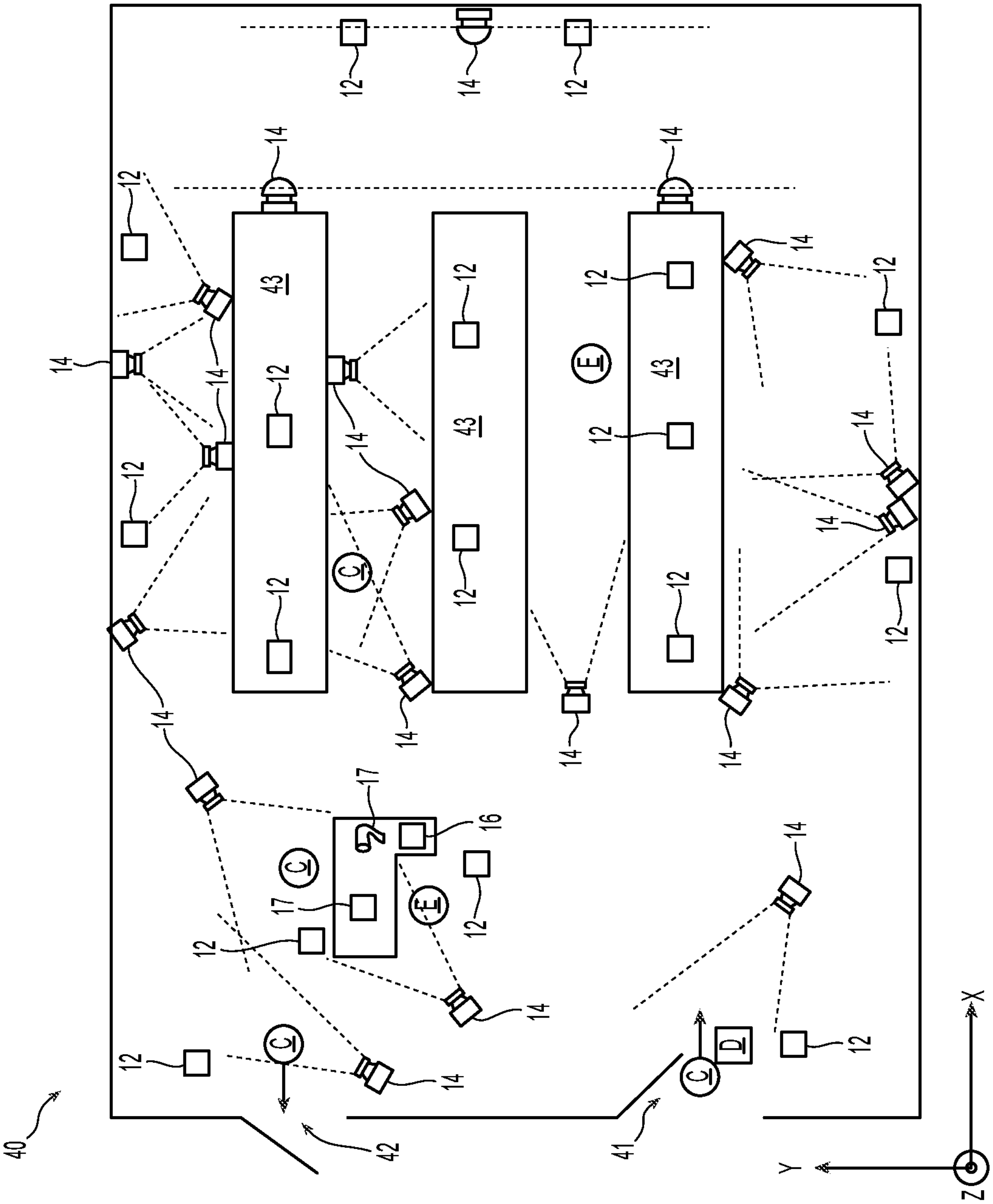
FIG. 2 is a top view of an embodiment of a theft prediction and tracking system in use in a retail establishment in accordance with the present disclosure.

With reference to FIG. 2, an exemplary embodiment of the disclosed theft prediction and tracking system 10 is shown in the form of an overhead view of a retail establishment 40 in which theft prediction and tracking system 10 is utilized. Retail establishment 40 includes at least one entrance 41, at least one exit 42, and one or more merchandise shelves 43 which contain the various goods offered for sale by retail establishment 40. It should be understood that embodiments of the present disclosure are not limited to use in a retail establishment, and may be used in any applicable environment, including without limitation, a warehouse, a fulfillment center, a manufacturing facility, an industrial facility, a scientific facility, a military facility, a workplace, an educational facility, and so forth.

The one or more RF emission detectors 12 and one or more video cameras 14 are located throughout retail establishment 40. The one or more RF emission detectors 12 are generally arranged throughout retail establishment 40 to enable theft prediction and tracking system 10 to receive and localize radiofrequency signals which are transmitted by a personal electronic device D. Examples of a personal electronic device D may include any electronic device in the possession of, or associated with, a customer C or an employee E, which emits electromagnetic energy, such as, without limitation, a cellular phone, a smart phone, a tablet computer, a wearable or interactive eyeglass-type device, a medical implant (e.g., a cardiac pacemaker), a child tracking or monitoring device, a two-way radio (including trunked and digital radios), an RFID badge, a credit or debit card, a discount card, and so forth.

The one or more RF emission detectors 12 are positioned within retail establishment 40 in a manner whereby one more one or more RF emission detectors 12 may be able to concurrently receive a signal emitted from a personal electronic device D. As described in detail below, RF emission detector 12 is configured to analyze RF emissions from a personal electronic device D, to determine whether such emissions include information which uniquely identifies personal electronic device D, and to convey such unique identification to server 20.

Server 20 includes a processor 51 operatively coupled to a memory 52, a database 50, and includes video recorder 53, which may be a network video recorder (NVR) and/or a digital video recorder (DVR) that is configured to store a video stream with a timecode captured by the one or more video cameras 14. The timecode may be encoded within the video stream (e.g., within an encoded datastream formatted in accordance with H.264/MPEG4 or other motion video standard) and/or may be superimposed over the video image as a human-readable clock display.

A physical location associated with each of the one or more RF emission detectors 12 is stored by theft prediction and tracking system 10. In embodiments, a three-dimensional Cartesian space representing the physical layout of retail establishment 40 is established, wherein the X and Y axes correspond to a horizontal position of an RF emission detector 12 within retail establishment 40, and the Z axis corresponds to a vertical (elevation) position of an RF emission detector 12. In embodiments, the X, Y, Z coordinates of each RF emission detector 12 is stored in a database 50 that is operatively associated with server 20. In other embodiments, the coordinates of each RF emission detector 12 may be stored within RF emission detector 12. The coordinates of RF emission detector 12 may be determined and stored during the initial installation and configuration of theft prediction and tracking system 10.

In use, as a customer C moves about retail establishment 40, one or more signals emitted from customer C's personal electronic device D are identified by the one or more RF emission detectors 12. In addition, one or more additional signal parameters are determined and communicated to server 20, which, in turn, stores the signal parameters in association with identification information extracted from the one or more signals emitted from customer C's personal electronic device D. In particular, a signal strength parameter is determined which indicates the amplitude of each detected RF emission, together with a timestamp indicating the time at which the signal was received. The one or more RF emission detectors 12 may be configured to provide continuous or periodic updates of signal properties (e.g., the identification information, timestamp, and signal parameters) to server 20. In some embodiments, a timestamp may additionally or alternatively be generated by server 20. The combination of the identification information, timestamp, and signal parameters (e.g., amplitude) may be combined into a message, which, in turn is communicated to server 20 and stored in database 50 for subsequent analysis. Each individual message includes an identifier, a timestamp, and one or more signal parameter(s) to form an emissions signature (e.g., an RF "fingerprint") of customer C's RF emissions at a given location at a given point in time.

The one or more RF emission detectors 12 will continue to collect and send electronic snapshots relating to customer C. Server 20 is programmed to analyze the received snapshots in order to triangulate the physical position of each personal electronic device D, and thus, each customer C, as each customer C moves about retail establishment 40. In one embodiment, server 20 is programmed to select a plurality of snapshots, each relating to the same personal electronic device D and having a timestamp falling within a predefined range from each other, and compare the relative amplitudes (signal strengths) corresponding to each of the plurality of snapshots, to determine customer C's physical position within the coordinate system of retail establishment 40. In some embodiments, other signal parameter, such as, without limitation, a phase shift, a spectral distribution, may be utilized to triangulate a physical position in addition to or alternatively to utilizing an amplitude.

Additionally, server 20 may be programmed to analyze historical relative signal strengths in order to more improve the accuracy of triangulation. For example, a historical maximum amplitude may be determined after a predetermined number of snapshots are accumulated. The maximum amplitude is correlated to a distance between the personal electronic device D and the corresponding RF emission detector 12 which detected the maxima based upon a triangulation of that snapshot. A distance rule is then generated for that personal electronic device D which relates signal strength (or other property) to the triangulated distance. During subsequent snapshots relating to the particular personal electronic device D, for which insufficient additional snapshots are available to accurately perform a triangulation, the distance rule may be utilized to provide a best guess estimate of the position of personal electronic device D. This may be particularly useful when, for example, RF emission detector 12 is located at a perimeter wall or in a corner of retail establishment 40, which constrains the range of possible locations to those within the confines of retail establishment 40. In one example, one or more video cameras 14 are used to triangulate a location of a person (e.g., customer C) to enable flagging with one or more of the RF emission detectors 12 that are located in close proximity to the person (e.g., the RF emission detector 12 that is closest to the person's triangulated location).

Figure 3:
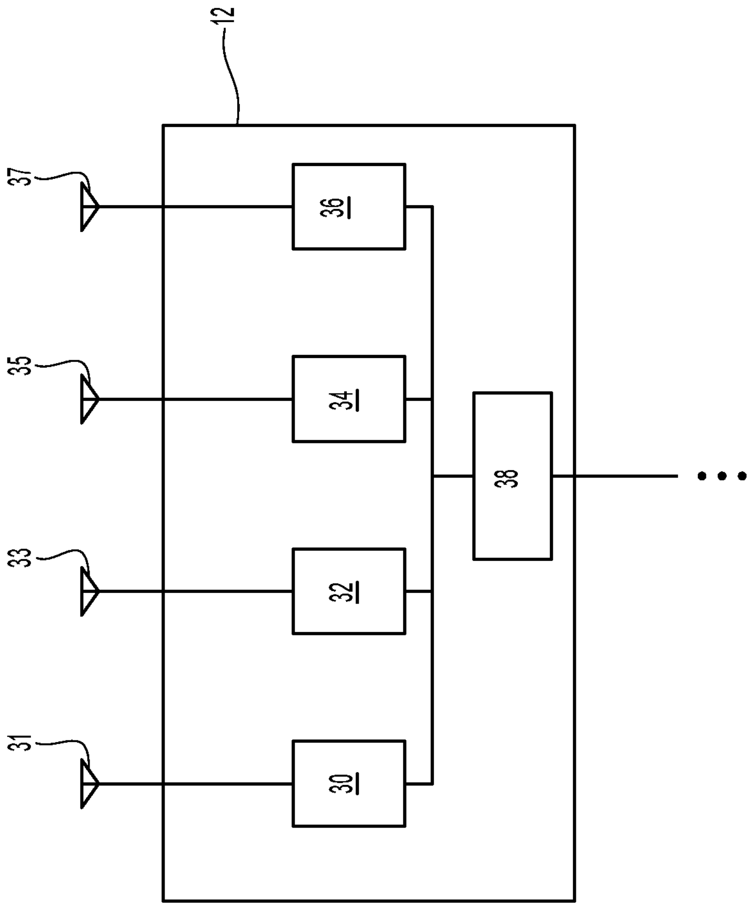
FIG. 3 is a block diagram of an embodiment of an RF emission detector in accordance with the present disclosure.

With reference to FIG. 3, an embodiment of RF emission detector 12 includes a cellular receiver 30 operatively coupled to at least one cellular antenna 31, a Bluetooth receiver 32 operatively coupled to at least one Bluetooth antenna 33, a WiFi receiver 34 operatively coupled to at least one WiFi antenna 35, and a multiband receiver 36 operatively coupled to a multiband antenna 37. Cellular receiver 30, Bluetooth receiver 32, WiFi receiver 34, and multiband receiver 36 are operatively coupled to controller 38. Cellular receiver 30 is configured to receive a cellular radiotelephone signal transmitted from personal electronic device D, and may include the capability of receiving CDMA, GSM, 3G, 4G, LTE and/or any radiotelephone signal now or in the future known. In embodiments, cellular receiver 30 is configured to detect various properties exhibited by the cellular radiotelephone signal transmitted from personal electronic device D, such as a unique identifier associated with personal electronic device D (which may include, but is not limited to, a telephone number, an electronic serial number (ESN), an international mobile equipment identity (IMEI), and so forth), a signal strength, and other properties as described herein.

Bluetooth receiver 32 is configured to receive a Bluetooth wireless communications signal transmitted from personal electronic device D, and may include the capability of receiving Bluetooth v1.0, v1.0B, v1.1, v1.2, v2.0+EDR, v2.1+EDR, v3.0+HS and/or any wireless communications signal now or in the future known. In embodiments, Bluetooth receiver 32 is configured to detect various properties exhibited by a Bluetooth signal transmitted from personal electronic device D, such as a unique identifier associated with personal electronic device D (which may include, but is not limited to, a Bluetooth hardware device address (BD_ADDR), an IP address, and so forth), a signal strength, and other properties as described herein. In embodiments, Bluetooth receiver 32 may include one or more near-field communications receivers or transceivers configured to receive and/or transmit Bluetooth Low Energy (BLE) beacons, iBeacons™, and the like.

WiFi receiver 34 is configured to receive a WiFi (802.11) wireless networking signal transmitted from personal electronic device D, and may include the capability of receiving 802.11a, 802.11b, 802.11g, 802.11n and/or any wireless networking signal now or in the future known. In embodiments, WiFi receiver 34 is configured to detect various properties exhibited by the WiFi signal transmitted from personal electronic device D, such as a unique identifier associated with personal electronic device D (which may include, but is not limited to, a media access control address (MAC address), an IP address, and so forth), a signal strength, and other properties as described herein.

Multiband receiver 36 may be configured to receive a radiofrequency signal transmitted from personal electronic device D, and may include the capability to scan a plurality of frequencies within one or more predetermined frequency ranges, and/or to determine whether the signal includes an encoded identifier. If no encoded identifier is detected, the signal is analyzed to determine whether one or more distinguishing characteristics are exhibited by the signal, such as, without limitation, a spectral characteristic, a modulation characteristic (e.g., AM, FM, or sideband modulation), a frequency, and so forth. One or more parameters corresponding to the detected distinguishing characteristics may be utilized to assign a unique identifier. In embodiments, a hash function (such as without limitation, an md5sum) may be employed to generate a unique identifier. In embodiments, multiband receiver 36 may be configured to interrogate and/or receive signals from an RFID chip included in personal electronic device D and/or in possession of customer C.

Referring again to FIG. 1, at least one RF emission detector 12 is located in proximity to entrance 41, and at least one RF emission detector 12 is located in proximity to exit 42. In addition, at least one video camera 14 is trained on entrance 41, and at least one video camera 14 is trained on exit 42. As customer C enters and/or exits retail establishment 40, an emissions signature is captured. Concurrently, at least one video camera 14 captures video of the customer entering and/or exiting retail establishment 40. Both the RF snapshot generated by the appropriate RF emission detector 12 and the video stream captured by the at least one video camera 14 are transmitted to server 20 for storage, retrieval, and analysis.

Figure 4:
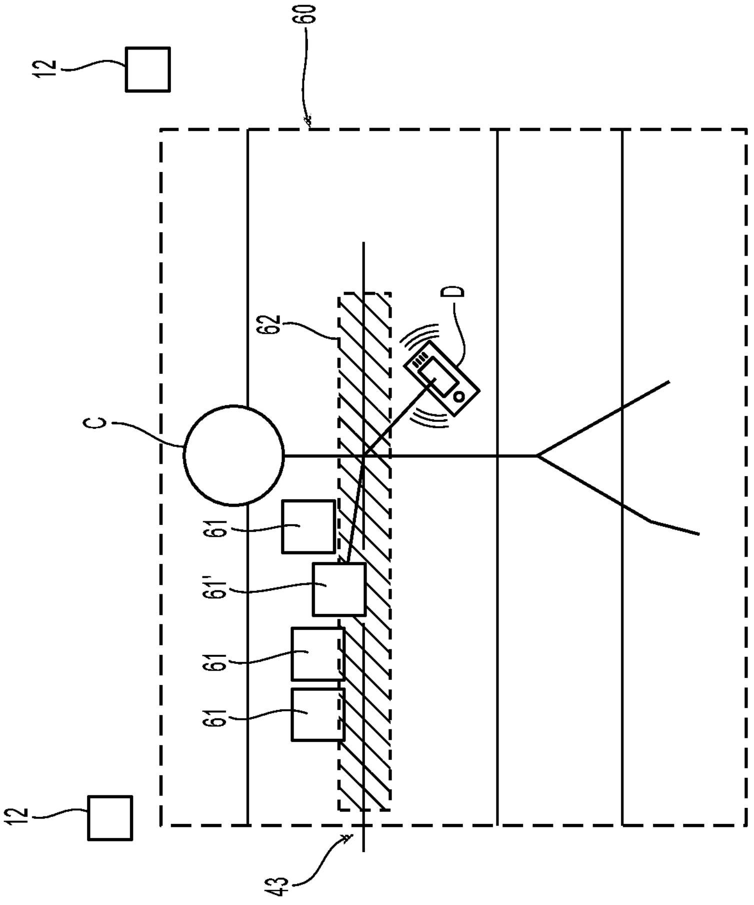
FIG. 4 is a view of a tripwire motion detection region in accordance with an embodiment in accordance with the present disclosure.

Turning now to FIG. 4, theft prediction and tracking system 10 includes a tripwire detection feature (a.k.a. video analytics) which enables a region of a video frame 60 captured by the at least one video camera 14 to be defined as a trigger zone 62. In the present example shown in FIG. 4, the at least one video camera 14 is trained on a portion of shelves 43 on which a number of items 61 are placed. Trigger zone 62 is configured such that, as customer C removes an item 61' from the shelve 43, item 61' moves into, crosses, or otherwise intersects the trigger zone 62, which, in turn, causes theft prediction and tracking system 10 to recognize that an item 61 has been removed from the shelf. Concurrently therewith, the position of customer C, who is in possession of personal electronic device D, is identified by triangulation enabled by the RF emission detectors 12 in the vicinity of video frame 60. In this manner, theft prediction and tracking system 10 recognizes that customer C is in possession of item 61'. In some embodiments, an acknowledgement of the fact that customer C is in possession of item 61' is recorded in server 20. As customer C continues to shop and select additional items for purchase, those additional items will also be recorded by theft prediction and tracking system 10 (e.g., in server 20).

Referring again to FIG. 2, customer C has completed selecting items for purchase and approaches checkout station 16 for checkout processing. As customer C arrives at checkout station 16, the fact of this arrival is identified by RF emission detectors 12 in the vicinity of checkout station 16, which enable the triangulation of customer C's position at checkout station 16. Employee E checks out each item selected for purchase by customer C by scanning the items with automatic identification device 17 and/or by entering a product identifier using a manual keyboard (not shown). The items checked at checkout station 16 are compared to the items previously recorded by theft prediction and tracking system 10 during customer C's visit. If any items which were recorded as being selected by customer C are determined to have not been checked out at checkout station 16, theft prediction and tracking system 10 flags customer C as a potential shoplifter. In some embodiments, additional identifying information provided by customer C in connection with the purchase transaction, such as, without limitation, a name, a credit or debit card number, a discount club card, a telephone number, and the like, are communicated to server 20 and stored in database 50 in association with emissions signature data and/or video captured and/or stored with respect to customer C.

In some embodiments, a security message may be generated and transmitted to a monitoring device 22 to alert security personnel that a potential shoplifting is in progress. Additionally or alternatively, one or more views of customer C, which may include still or moving images of customer C removing the item in question from a shelf, of customer C entering retail establishment 40, exiting retail establishment 40, and/or of customer C moving about retail establishment 40 may be provided to security personnel for review.

In some instances, a customer C may bypass checkout station 16, and instead proceed directly to an exit 42 without paying for items which customer C had previously taken into possession from shelf 43. As customer C approaches exits 42, one of more RF emission detectors 12 located in proximity to exit 42 enables theft prediction and tracking system 10 to recognize that customer C is attempting to abscond with stolen merchandise, and in response, transmit a security message to a monitoring device 22 as described above. In addition, theft prediction and tracking system 10 flags customer C as being a potential shoplifter, by, e.g., storing the flag in database 50 and/or database 54.

In some embodiments, theft prediction and tracking system 10 may be configured to determine whether a personal electronic device D associated with and/or in the possession of customer C is configured to receive near field communications, such as without limitation, a BLE communication, an iBeacon™ in-store notification, and the like. In the event that theft prediction and tracking system 10 has identified that customer C may be a potential shoplifter, prediction and tracking system 10 may, in addition to or alternatively to flagging customer C in a database 50, 54, attempt to transmit a flag to personal electronic device D for storage therein indicating that personal electronic device D is associated with and/or in the possession of potential shoplifter customer C. In embodiments, the flag may be encoded within an in-store offer that is transmitted to personal electronic device D. For example, an offer identifier may include an encrypted code, a hash code, a steganographically-encoded data item (e.g., a graphic image), and/or any data item indicative of the fact that the personal electronic device D and/or customer C has been associated with potential theft. In embodiments, the flag may include a customer identifier, a location, a date, an item identifier, an item value, and/or graphic evidence of the theft. In the event customer C is detained and/or apprehended by authorities, the flag stored within personal electronic device D may be read by any suitable technique, including forensic analysis, to assist authorities with the investigation and/or prosecution of undesirable, unlawful, or criminal behavior.

When a customer C enters retail establishment 40 via entrance 41, an RF emission detector 12 that is located in proximity to entrance 41 receives one or more RF emissions from a personal electronic device D associated with customer C, and communicates an RF snapshot to server 20. Server 20 queries database 50 to determine whether customer C has previously been flagged as a potential shoplifter, and, in response to an affirmative determination that customer C was flagged previously as a potential shoplifter, causes a security message to be generated and transmitted to a monitoring device 22 to alert security personnel that a potential shoplifter has entered (or re-entered) the retail establishment 40. In one embodiment, once a person (e.g., customer C) who has been flagged enters the retail establishment 40, the person is automatically tracked by the system 10 (e.g., by way of one or more of the video cameras 14) and/or manually tracked by security personnel.

In embodiments, theft prediction and tracking system 10 includes a community server 24 having a processor 55 operatively coupled to a memory 56 and a community database 54. Data relating to potential shoplifters may be uploaded to, or downloaded from, community database 54. In one example, when a customer C enters a retail establishment 40 via entrance 41, server 20 queries database 50 to determine whether customer C has previously been flagged as a potential shoplifter. If a negative determination is made, i.e., that customer C was not flagged previously as a potential shoplifter, server 20 may conduct a subsequent query to community database 54 to determine whether customer C was flagged at another retail establishment 40. In some embodiments, database 50 and community database 54 may be queried substantially concurrently. In this manner, information relating to potential shoplifters may be aggregated and shared among a plurality of retail establishments, which may assist in the reduction and/or prevention of loss, may enable insurance carriers to offer discounted premiums, and may discourage shoplifting attempts.

In some embodiments, a fee may be levied on an operator of retail establishment 40 by an operator of community server 24 for each query received from retail establishment 40 and/or for data downloaded from community server 24 by server 20. In some embodiments, a credit may be given to an operator of retail establishment 40 by an operator of community server 24 for data uploaded to community server 24 by server 20. In this manner, an operator of community server may recoup some or all of the costs of operating community server 24, while also providing an incentive for operators of a retail establishment 40 to participate in the community database.

Figure 5:
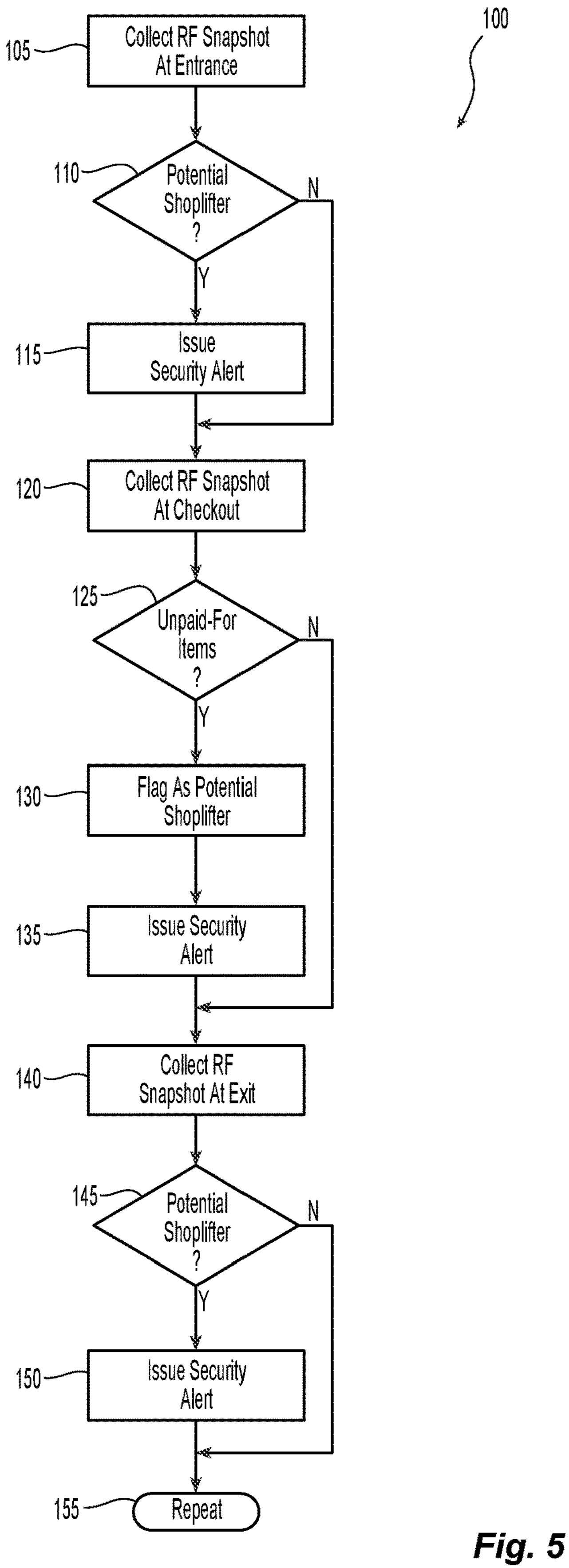
FIG. 5 is a flowchart illustrating a method of theft prediction and tracking in accordance with an embodiment of the present disclosure.

FIG. 5 presents a flowchart illustrating a method 100 of theft prediction and tracking in accordance with an embodiment of the present disclosure. In step 105, an emissions signature of a customer at an entrance 41 is collected and in step 110, the collected RF snapshot is used to determine whether the collected emissions signature has previously been associated with ("flagged") as a potential shoplifter. If it is determined that the collected RF snapshot has previously been flagged as belonging to a potential shoplifter, then in the step 115 a security alert is issued.

In step 120 an emissions signature of a customer at a checkout station 16 is collected and in step 125, the collected RF snapshot is used to determine whether the customer C associated with the collected emissions signature is in possession of items for which the customer C is expected to have paid, but has not. If such a determination is made in the affirmative, then in step 130, the RF snapshot is flagged as belonging to a potential shoplifter. In the step 135 a security alert is issued.

In step 140, an emissions signature of a customer at an exit 42 is collected and in step 145, the collected RF snapshot is used to determine whether the collected emissions signature is associated with a potential shoplifter. If it is determined that the collected RF snapshot is associated with a potential shoplifter. In the step 150 a security alert is issued. In step 155, the method iterates and continues to process emissions signatures as described herein.

Figure 7A:
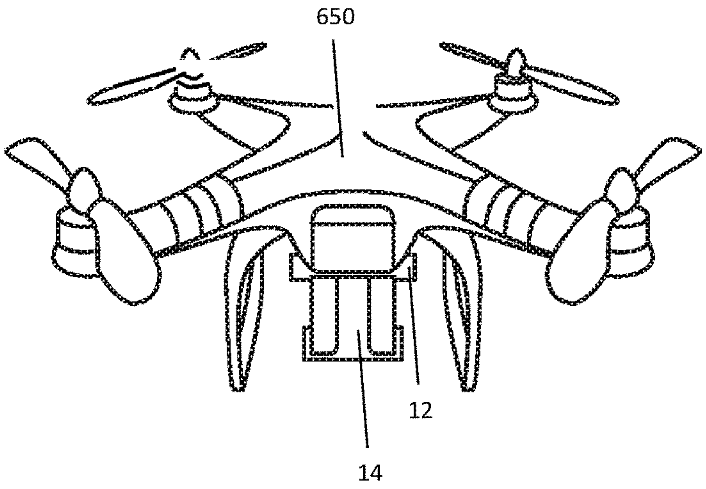
FIG. 7A is a perspective view of an aerial drone according to the present disclosure.
Figure 7B:
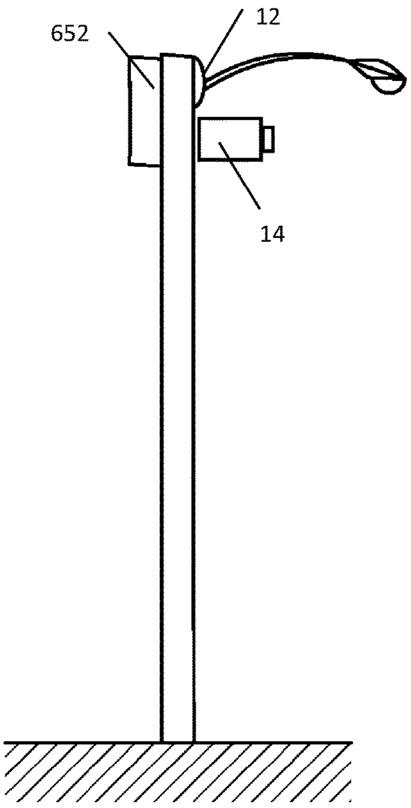
FIG. 7B is a perspective view of a traffic camera according to the present disclosure.

In various embodiments, one or more sensors, such as the RF emission detectors 12 and one or more of the video cameras 14 described above with reference to FIGS. 1-5 may be disposed, included as a part of, or is coupled to, one or more aerial drones 650 as shown in FIG. 7A (also sometimes referred to as unmanned aerial vehicles (UAV)). In further embodiments, the camera 14 may be a traffic camera 652 having the RF emission detector 12 as shown in FIG. 7B, that is configured to capture images of one or more areas and/or subjects to be tracked. The aerial drone camera(s) 650 and/or traffic camera(s) 652 can be employed to perform various functions, such as, for example, the various functions of the RF emission detectors 12 and the video cameras 14 described above with reference to FIGS. 1-5.

Figure 6:
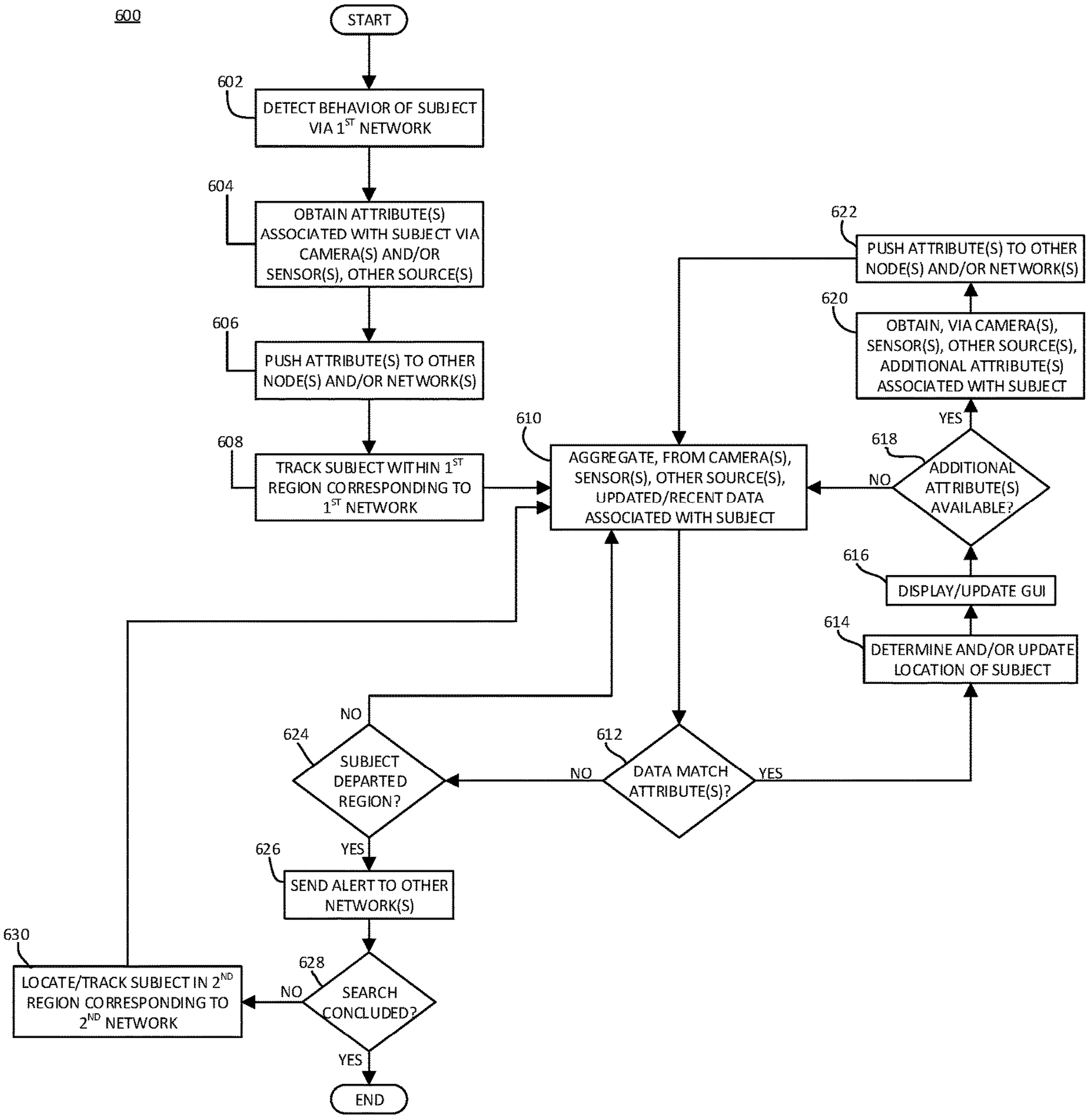
FIG. 6 is a flowchart illustrating an exemplary method for locating and/or tracking a location of a subject in accordance with the present disclosure.

In another embodiment, with reference to FIG. 6, one or more aerial drone cameras 650 and/or traffic cameras 652 may be employed, in conjunction with one or more other sources of information in some instances, to perform a method 600 for locating and/or tracking a location of one or more subjects, such as a person who has been detected as having committed a crime at a particular location, across regions that correspond to one or more networks, such as an aerial drone camera network, a traffic camera network, a store camera network, and/or other types of networks. In this manner, communication among multiple nodes and/or networks, including nodes and/or networks that employ aerial drone cameras and/or traffic cameras, can cooperate to facilitate more effective location of subjects and/or tracking of locations of subjects.

At 602, a behavior of a subject is detected in a region, such as a retail store premises, that corresponds to a first network, such as a network including the RF emission detectors 12, cameras 14, antennas 9, and/or the like. Although the method 600 is described in the context of a single subject or person, the method 600 is also applicable to multiple subjects, such as a group of people who are acting together or separately. Exemplary types of behaviors that can be detected at 602 include, without limitation, an action, an inaction, a movement, a plurality of event occurrences, a temporal event, an externally-generated event, the commission of a theft, the leaving of an unattended package, the commission of violence, the commission of a crime, and/or another type of behavior. In some example embodiments, in addition to, or as an alternative to, detecting a behavior of a subject at 602, an abnormal situation is detected, such as an abnormal condition (pre-programmed condition(s)), an abnormal scenario (loitering, convergence, separation of clothing articles or backpacks, briefcases, groceries for abnormal time, etc.) or other scenarios based on behavior of elements (customers, patrons, people in crowd, etc.) in one or multiple video streams. For the sake of illustration, the description of the method 600 is provided in the context of detecting a behavior of a subject at 602, but the method 600 is similarly applicable to detecting an abnormal situation at 602.

Detection of the behavior of the subject includes obtaining information from one or more source(s), such as video and/or image information of the subject obtained via one or more video cameras 14 installed at or near a premises, non-video information (e.g., mobile communication device data) obtained from one or more antennas 9 installed at or near the premises, information provided by an employee or witness by way of a server 20 at the premises, and/or other types of information obtained from other types of sources at or near the premises. Based on the obtained information, the behavior can be detected by way of the cameras 14 (in the case of smart cameras with such processing capability), and/or by a server 20 or a server that is communicatively coupled to the cameras 14.

In various embodiments, there may be multiple types of cameras 14, such as smart cameras 14 that have processing capabilities to perform one or more of the functions described in connection with the method 600, and non-smart cameras that lack processing capabilities to perform one or more of the functions described in connection with the method 600. In general, any one or more of the functions described in connection with the method 600 may be performed in a centralized manner by one or more of the cameras (or other components of networks), and/or in a distributed manner by one or more of the cameras 14 and/or the server 20, and/or the like. Additionally, the cameras, computers, and/or other components are configured, in some aspects, to communicate with one another to cooperate to execute the various functions of the method 600. For instance, in the event that a non-smart camera lacks processing capabilities to perform one or more of the functions described in connection with the method 600 (for example, a particular matching algorithm), the non-smart camera may communicate information (such as, for example, raw video data) to a smart camera and/or to a computer or other device that has the processing capabilities to perform the one or more particular functions described in connection with the method 600, so that the function(s) can be performed. Further, the non-smart camera may, in some aspects, forward to the smart camera, computer, or other device, information enabling the non-smart camera to be identified, so that if the non-smart camera captures an image of the subject, the location of the non-smart camera can be traced back and a location of the subject can be ascertained.

At 604, one or more attributes of the subject, or associated with the subject, are obtained from one or more sources. For example, an attribute of a face of the subject may be obtained by way of an image captured by way of a video camera 14, an attribute (e.g., a color, a type, and/or the like) of a clothing item that the subject is wearing can be obtained by way of an image captured by way of a video camera 14, mobile communication device data and/or a wireless signature of a mobile communication device or personal electronic device D that the subject is carrying can be obtained by way of an antenna 9, and/or the like.

At 606, the one or more attributes that are associated with the subject and were obtained at 604 are transmitted or pushed to one or more other nodes (e.g., video cameras 14, antennas 9, and/or other devices resident on one or more networks) and/or networks, for instance, to enable those other nodes and/or networks to locate the subject and/or track a location of the subject. The attribute(s) can be transmitted to one or more nodes and/or networks by way of the network, or any suitable wired and/or wireless communication path or network.

At 608, a tracking loop is initiated to track a location of the subject within a first region that corresponds to the first network. The tracking loop, in some embodiments, includes performing the procedures described below in connection with 610, 612, 614, 616, 618, 620, and 622 for the particular region in which the tracking is commencing. In one example, the first region is the region where the behavior of the subject was initially detected at 602. For instance, the first region may be a retail store premises and the first network may be a network of the video cameras 14, the antennas 9, and/or the like that are installed at or near the first region. In some example embodiments, the tracking loop is performed in parallel for multiple regions (e.g., by employing multiple nodes and/or networks, such as networks of aerial drone cameras, traffic cameras, store premises, and/or the like) in to facilitate more comprehensive tracking of the location of the subject and/or to facilitate tracking of the location of the subject across a wide area. In a further embodiment, the tracking loop is performed in parallel for multiple regions corresponding to multiple networks, and the multiple networks collaborate in tracking the location of the subject to share the processing load and/or provide more accurate or rapid tracking results.

At 610, updated and/or more recent data associated with the subject is aggregated from various sources, such as one or more of the cameras 14, antennas 9, and/or other sources. Example types of data that can be aggregated at 610 include, without limitation, a facial image of the subject, an image of clothing worn by the subject, mobile communication device data and/or a wireless signature of a mobile communication device or personal electronic device D carried by the subject, and/or other types of data.

At 612, a determination is made as to whether one or more items of data that were aggregated at 610 match the one or more attributes that were obtained at 604. For example, the determination at 612 may include comparing one or more items of data that were aggregated at 610 to the one or more attributes that were obtained at 604 to determine whether more recently captured data (such as, image data, video data, wireless communication data, and/or other types of data) correspond to the subject. In this manner, the determination at 612 can indicate whether the location of the subject in a particular region is still successfully being tracked, or whether the location of the subject is no longer successfully being tracked in the particular region and so a wider scoped search may be needed. In one example, the determination at 612 includes comparing an attribute (e.g., of a facial image) of the subject that was obtained at 604 to an attribute (e.g., of a facial image) of a person whose image was captured subsequent to the obtaining of the attribute at 604 (and, in some instance, by way of a different video camera 14) to determine whether the person whose image was subsequently captured matches the subject, thereby indicating that the location of the subject is still successfully being tracked.

In some embodiments, multiple types of attribute categories are arranged in hierarchical tiers according to complexity of processing required in detecting a match at 612. For example, a first tier of attributes for which the processing complexity required for detecting a match at 612 is minimal may include a clothing color or hair color associated with the subject. A second tier of attributes for which the processing complexity required for detecting a match at 612 is greater than that of the first tier of attributes may include mobile communication device data and/or wireless information relating to a mobile communication device carried by the subject and/or registered to the subject. A third tier of attributes for which the processing complexity required for detecting a match is even greater than that of the first and second tiers of attributes may include a gait of the subject. In this manner, depending on the tiers of attributes being employed for the matching at 612, and/or depending on the processing capabilities of the cameras 14, nodes, and/or other sources, processing of the matching at 612 can be redirected for completion by the appropriate device.

Referring now back to 612, if it is determined at 612 that one or more items of data that were aggregated at 610 match the one or more attributes that were obtained at 604 ("YES" at 612), then the method 600 progresses to 614. At 614, a location of the subject is determined based at least in part on the information aggregated at 610 and/or on other information. For example, the determining of the location of the subject at 614 includes, in some embodiments, computing a location of the subject based on a location of the camera 14 (or other source) from which the information was aggregated at 610.

At 616, information relating to the tracking of the location of the subject is displayed to a user (for example, a police officer or other emergency personnel) by way of a user interface, such as a graphical user interface (GUI). The GUI, in some examples, includes a map over which an overlay is displayed indicating a location of the subject being tracked. The GUI may also include additional information, such as one or more of the attributes of the subject being tracked, including for instance, a facial image of the subject obtained by way of one or more of the cameras 14, attributes of clothing worn by the user, an attribute of a mobile communication device carried by the user, a name or other information identifying the user generated, for instance, by matching the captured facial image of the subject to a facial image stored in a database of facial images, and/or the like. In this manner, the GUI enables the user to continually track the location of the subject throughout multiple regions that may correspond to multiple nodes and/or networks.

At 618, a determination is made as to whether any additional attribute associated with the subject being tracked is available. In some examples, the determination at 618 is based at least in part on one or more items of information-such as images of the subject, video of the subject, mobile communication device data and/or wireless signatures of mobile communication devices or personal electronic device D carried by the subject, and/or the like—that have been obtained thus far by way of the camera(s) 14, the antenna(s) 9, and/or other source(s). Example types of additional attributes that may be available include, without limitation, additional attributes of facial images captured of the subject having different angles and/or providing information beyond the information of previously obtained and recorded attributes, an attribute, such as a make, model, color, license plate number, of a vehicle that the subject has entered and is traveling in, and/or the like. By determining whether any additional attribute associated with the subject being tracked is available, a more comprehensive and robust profile of the subject may be compiled, thereby facilitating more accurate and efficient tracking of the location of the subject.

If it is determined at 618 that any additional attribute associated with the subject being tracked is available ("YES" at 618), then the method 600 proceeds to 620. At 620, the additional attribute associated with the subject being tracked is obtained by way of the camera(s) 14, the antenna(s) 9, and/or the other source(s), and is stored in a memory for later use. At 622, the additional attribute that was obtained at 620 is transmitted or pushed to one or more other nodes and/or networks, for instance, to enable those other nodes and/or networks to more effectively locate the subject and/or track a location of the subject. From 622, or if it is determined at 618 that no additional attribute associated with the subject being tracked is available ("NO" at 618), then the method 600 proceeds back to 610 to aggregate updated and/or more recent data associated with the subject to continually track the location of the subject throughout the region.

In some embodiments, at 618, in addition or as an alternative to determining whether any additional attribute associated with the subject being tracked is available, a determination is made as to whether any attribute associated with the subject being tracked has changed. For example, in some cases the subject may be tracked based on multiple attributes, such as a hair color, a clothing color, a height, a vehicle make, a vehicle model, a vehicle color, a vehicle license plate, mobile communication device data, and/or the like. The multiple attributes may originate from a variety of sources, such as an image of the subject previously captured by the video camera(s) 14, mobile communication device information previously captured by the antenna(s) 9, intelligence provided by law enforcement personnel, and/or the like. In this manner, when an image of a person is obtained by way of the cameras 14 and/or mobile communication device information associated with a person is obtained by way of the antennas(s) 9, the person can be identified as matching the subject who is being tracked with a degree of confidence that is proportional to the number of attributes of the person that are detected in the image as matching the multiple attributes that serve as the basis upon which the subject is being tracked. In some cases, one of the attributes of the subject may change. For example, the subject may remove a wig, change vehicles, change clothing, and/or the like in an effort to elude tracking and capture. In such cases, it may be determined at 618 that one or more of the multiple attributes have changed. In particular, if the cameras 14 and/or antennas 9 are no longer able to detect a person matching all of the multiple (for example, five) attributes being tracked, then the server 20 may search for a person matching a lesser number (for example, four or fewer) of the attributes that were previously being tracked. If a person matching the lesser number of the attributes is detected by one or more of the cameras 14 and/or antennas 9, then that person may be flagged as a secondary subject to be tracked simultaneously while searching for the primary subject having attributes that match all the multiple attributes being tracked. If the person matching all of the multiple attributes is no longer locatable by the images captured via the cameras 14 and/or the information obtained by the antennas 9, then the secondary subject matching the lesser number of the attributes may be promoted to be the primary subject so that tracking resources may be appropriately and effectively allocated. In some cases, the change in attribute is verified before the secondary subject is promoted to being the primary subject. For example, the change in attribute may be verified by the processing of images captured via the cameras 14, which detect the subject discarding a clothing item or a wig. Alternatively, the change in attribute may be verified by law enforcement personnel who locate the discarded clothing item or wig. In this regard, the server 20 may provide a location and time information to law enforcement personnel based on the last known or tracked location of the primary subject matching all of the multiple attributes, to enable the law enforcement to dispatch personnel to the location to conduct the verification. Additionally, when the subject is being tracked across multiple networks, the server 20 can push the updated list of attributes (for example, the lesser number of attributes) to one or more other nodes (e.g., cameras 14, antennas 9, and/or other devices resident on one or more networks) and/or networks. This facilitates improved adaptive tracking of subjects across multiple networks even when the subjects are expending effort to change their image to elude tracking and capture.

Referring back to 612, if it is determined that the one or more items of data that were aggregated at 610 do not match the one or more attributes that were obtained at 604 ("NO" at 612), then the method 600 proceeds to 624. At 624, a determination is made as to whether the subject has departed the region in which the subject previously was being tracked, for instance, the region corresponding to the premises at which the behavior was detected at 602. In some embodiments, the determination at 624 is based on the amount of time that has elapsed since the location of the subject was successfully being tracked. In particular, if the amount of time that has elapsed since the location of the subject was successfully being tracked exceeds a predetermined threshold, then it is determined at 624 that the subject has departed the region, and if the amount of time that has elapsed since the location of the subject was successfully being tracked does not exceed the predetermined threshold, then it is determined at 624 that the subject has not departed the region.

If it is determined at 624 that the subject has not departed the region in which the subject previously was being tracked ("NO" at 624), then the method 600 proceeds back to 610 to aggregate updated and/or more recent data associated with the subject to continually track the location of the subject throughout the region. If, on the other hand, it is determined at 624 that the subject has departed the region in which the subject previously was being tracked ("YES" at 624), then the method 600 progresses to 626. At 626, an alert is communicated to one or more other nodes and/or networks, by way of one or more wired and/or wireless communication paths, indicating that the subject has departed the first region in which the subject previously was being tracked, for instance, the region corresponding to the premises at which the behavior was detected at 602. In some embodiments, the alert is provided to a wide area of nodes and/or networks that are adjacent and/or proximal to the region in which the subject previously was being tracked. In this manner, the additional neighboring nodes and/or networks can attempt to locate the subject and/or track a location of the subject.

In some embodiments, the alert is provided to a select set of nodes and/or networks based on one or more factors that enable more efficient allocation of tracking resources. For example, a determination may be made as to whether any traffic cameras in the region have detected a traffic law violation, such as driving through a red light. If a traffic camera in the region has detected a traffic law violation, then, based on a prediction that the traffic law violation may have been committed by the subject fleeing the scene of a crime, the alert may be provided to one or more nodes and/or networks that overlap with a region of the traffic camera in an effort to quickly locate the customer without the need to utilize a wide array of cameras and/or other resources. In addition, based on the detection at 624 that the subject has departed the region in which the subject previously was being tracked, police or other emergency personnel can launch one or more aerial drone cameras 14 that can communicate attributes and other information with one another to facilitate a collaborative search plan, based in part on one or more neighboring regions of interest, to identify and/or track a location of the subject.

At 628, a determination is made as to whether the searching for, and/or tracking of, the location of the subject is concluded. In some embodiments, the determination at 628 is based on whether an instruction has been received from a police officer or other emergency personnel indicating that the search for the subject has been concluded, for instance, in a case where the subject has been apprehended and is in police custody. If it is determined at 628 that the searching for, and/or tracking of, the location of the subject is not concluded ("NO" at 628), then the method 600 proceeds to 630 where a tracking loop is initiated to identify and/or track a location of the subject within a second region that corresponds to a second network. The tracking loop, in some embodiments, includes performing the procedures described above in connection with 610, 612, 614, 616, 618, 620, and 622 for the particular region in which the tracking is commencing. If, on the other hand, it is determined at 628 that the searching for, and/or tracking of, the location of the subject is concluded ("YES" at 628), then the method 600 ends.

The described embodiments of the present disclosure are intended to be illustrative rather than restrictive, and are not intended to represent every embodiment of the present disclosure. Further variations of the above-disclosed embodiments and other features and functions, or alternatives thereof, may be made or desirably combined into many other different systems or applications without departing from the spirit or scope of the disclosure as set forth in the following claims both literally and in equivalents recognized in law.

What is claimed is:

1. A system for tracking a location of one or more persons of interest, the system comprising:

a first network disposed in a first region, the first network including a first camera configured to capture video data of a person in the first region, wherein the video data includes a first video frame;

a second network disposed in a second region, the second network including a second camera configured to capture additional video data of the person in the second region, wherein the additional video data includes a second video frame;

a plurality of wireless emission detectors configured to receive an electromagnetic signal associated with the person;

a computing device configured to:

determine a location of a source of the electromagnetic signal associated with the person based on a respective location of the plurality of wireless emission detectors relative to the person;

identify the person, using triangulation enabled by wireless emission detectors in a vicinity of the first video frame;

track the person in the first region, using triangulation enabled by the wireless emission detectors in the vicinity of the first video frame;

associate the first video frame and the second video frame to create a continuous tracking of the person across the first and second regions using triangulation enabled by the plurality of wireless emission detectors;

track the person in the second region, using triangulation enabled by wireless emission detectors in the vicinity of the second video frame; and a graphical user interface configured to display a map and location of the person.

2. The system according to claim 1, wherein the computing device is further configured to analyze the video data to determine whether the person has taken possession of an item associated with an item identifier, and wherein the graphical user interface is further configured to issue an alert including an identity of the person.

3. The system according to claim 1, wherein the plurality of wireless emission detectors are configured to capture wireless data transmitted by a mobile communication device on the person, and wherein the computing device is further configured to identify a wireless attribute of the mobile communication device from the wireless data.

4. The system according to claim 3, wherein the computing device is further configured to identify a personal attribute of the person from the video data.

5. The system according to claim 4, wherein the personal attribute is selected from the group consisting of a face of the person, a color of a clothing item worn by the person, and a type of a clothing item worn by the person.

6. The system according to claim 5 wherein the graphical user interface is further configured to display at least one of the wireless attribute or the personal attribute adjacent the location of the person on the graphical user interface.

7. The system according to claim 3, wherein capturing video data and capturing wireless data are done by an aerial drone carrying the first camera and at least one of the plurality of wireless emission detectors.

8. The system according to claim 1, wherein using triangulation includes using at least one of a signal strength, a phase shift, and a spectral distribution of the electromagnetic signal.

9. A method for tracking a location of one or more persons of interest, the method comprising:

capturing video data of a person at a first camera of a first network disposed in a first region, wherein the video data includes a first video frame;

determining a location of a source of an electromagnetic signal associated with the person based on a respective location of a plurality of wireless emission detectors relative to the person;

identifying the person using triangulation enabled by the plurality of wireless emission detectors in a vicinity of the first video frame;

tracking the person in the first region, using triangulation enabled by wireless emission detectors in the vicinity of the first video frame;

capturing additional video data of the person at a second camera of a second network disposed in a second region, wherein the additional video data includes a second video frame;

associating the first video frame and the second video frame to create a continuous tracking of the person across the first and second regions using triangulation enabled by the plurality of wireless emission detectors;

tracking the person in the second region based on the additional video data; and displaying on a graphical user interface including a map and location of the person.

10. The method according to claim 9, further comprising:

analyzing the video data to determine whether the person has taken possession of an item associated with an item identifier; and issuing an alert including an identity of the person.

11. The method according to claim 9, further comprising:

capturing wireless data transmitted by a mobile communication device on the person at one of the plurality of wireless emission detectors disposed in the first region; and identifying a wireless attribute of the mobile communication device from the wireless data.

12. The method according to claim 11, further comprising:

identifying a personal attribute of the person from the video data.

13. The method according to claim 12, wherein the personal attribute is selected from the group consisting of a face of the person, a color of a clothing item worn by the person, and a type of a clothing item worn by the person.

14. The method according to claim 13 further comprising:

displaying at least one of the wireless attribute or the personal attribute adjacent the location of the person on the graphical user interface.

15. The method according to claim 11, wherein capturing video data and capturing wireless data are done by an aerial drone carrying the first camera and at least one of the plurality of wireless emission detectors.

16. The method according to claim 9, wherein using triangulation includes using at least one of a signal strength, a phase shift, and a spectral distribution of the electromagnetic signal.

17. A non-transitory computer-readable medium comprising software for tracking a location of one or more persons of interest, which software, when executed by a computer system, causes the computer system to perform operations comprising a method of:

capturing video data of a person at a first camera of a first network disposed in a first region, wherein the video data includes a video frame;

determining a location of a source of an electromagnetic signal associated with the person based on a respective location of a plurality of wireless emission detectors relative to the person;

identifying the person using triangulation enabled by the plurality of wireless emission detectors in a vicinity of the video frame;

tracking the person in the first region, using triangulation enabled by wireless emission detectors in the vicinity of the video frame;

capturing additional video data of the person at a second camera of a second network disposed in a second region, wherein the additional video data includes a second video frame;

associating the first video frame and the second video frame to create a continuous tracking of the person across the first and second regions using triangulation enabled by the plurality of wireless emission detectors;

tracking the person in the second region, using triangulation enabled by wireless emission detectors in the vicinity of the video frame, based on the additional video data; and displaying on a graphical user interface including a map and location of the person.

* * * * *